Oct. 21, 1958 B. L. MOULTHROP ET AL 2,857,335
REGENERATION OF SOLID GRANULAR CONTACT MATERIAL
Filed March 11, 1954 8 Sheets-Sheet 2

Fig. 3

INVENTOR.
WILLIAM F. ELLIS
BY BENJAMIN L. MOULTHROP

*Charles G. Huggett*

ATTORNEY

Fig. 7 — Lateral Temperature Patterns in Bottom Section of Single-Zone TCC Kiln Comparison at Same Peak Temperature Level.

INVENTOR.
WILLIAM F. ELLIS
BY BENJAMIN L. MOULTHROP
Charles A. Huggett
ATTORNEY

INVENTORS
William F. Ellis
BY Benjamin L. Moulthrop
Charles A. Huggett
ATTORNEY

United States Patent Office 2,857,335
Patented Oct. 21, 1958

2,857,335

REGENERATION OF SOLID GRANULAR CONTACT MATERIAL

Benjamin L. Moulthrop, Pitman, N. J., and William F. Ellis, Beaumont, Tex., assignors to Socony Mobil Oil Company, Inc., a corporation of New York Application March 11, 1954, Serial No. 415,562

6 Claims. (Cl. 252—418)

This invention deals with an improved method and apparatus for the regeneration or heating of a particle-form contact material containing a carbonaceous contaminant deposited thereon. It particularly relates to the regeneration of solid contact material in processes such as the moving bed conversion process wherein hydrocarbons are cracked or reformed, as well as various other related treating processes.

In the petroleum field a large portion of the gasoline used today is obtained from cracking or reforming processes. One commercially successful process involves the gravitation of a compact mass or granular contact material through a reaction or treating zone wherein it is contacted by a suitable hydrocarbon, properly prepared for treatment, in a continuous manner. The hydrocarbons are passed through the bed of contact material and are cracked or reformed during the process. A carbonaceous contaminant is deposited on the surface of the contact material during the reaction and the spent material is continuously withdrawn from the bottom of the reaction zone. This spent material is then passed downwardly through a regeneration zone or kiln wherein it is contacted with air, in sufficient amount to burn the deposits from the surface of the material. This renders the material suitable for re-use in the process and the regenerated material is, therefore, removed from the bottom of the regeneration zone and transferred again to the top of the reaction zone.

A variety of natural or treated clays such as bauxite, montmorillonite, fuller's earth, have heretofore been used as the catalytic material in these processes; also, synthetic materials such as co-precipitated gels of silica-alumina or silica-chromia, have been used as catalytic material. The catalyst is usually formed in a generally regular shape, such as pellets, or pills or spheres. The size range is carefully controlled in these moving bed processes so as to provide suitable uniform void spaces between the contact material particles in the bed. A suitable size range is about 4 to 10 mesh Tyler screen analysis although for various purposes other sizes may be used, ranging from about 3 to 60 mesh Tyler. During the regeneration of the spent contact material, it is necessary to prevent the temperature of the catalyst from rising above a critical maximum temperature in order to prevent the material from being heat damaged. It has been found that if the critical maximum temperature is exceeded, the material will lose its catalytic activity. This critical maximum temperature varies for the different types of catalytic material. For example, for a natural clay it may be limited at about 1200° F., whereas for a synthetic material such as silica-alumina, the limit may be as high as 1400° F. for long periods and 1450 to 1475 for a short time. Where the burning is uneven in the kiln, localized hot spots may develop which provide a limit for the entire kiln. For example, the burning capacity of the kiln is limited below that which would cause any region in the kiln to develop a catalyst temperature higher than the limiting temperature.

Recent commercial kilns for moving bed conversion processes have utilized a gas introduction pipe terminating at a level below the surface of the bed in the kiln at points uniformly distributed across the kiln. A large number of these pipes have been used so that the gas introduced into the bed is readily distributed across the bed. It has been found, however, that the spacing of these pipes in the catalyst bed is exceedingly critical where the gas after leaving the gas introduction pipes travels concurrently with the gravitating catalyst. It has been found that the temperature difference at various locations across the bed of the presently used moving bed kilns may be as high as 200° F. at the bottom of the bed. This provides a serious limitation of the burning capacity of these kilns in that the burning must be limited to prevent the hottest catalyst from exceeding the heat damaging level. This also provides an uneven regeneration of the catalyst, that catalyst passing through those portions of the bed which reach the highest temperature is completely regenerated whereas that catalyst passing through the region of the bed which is at the lowest temperature is incompletely regenerated. This provides catalyst of varying activity in the reactor which is, of course, undesirable.

We have discovered that these temperature differences in the kiln can be largely eliminated provided the gas distribution points are located across the bed of contact material at a spacing less than about 10 inches and broadly between about 5–10 inches. That is, the air must be introduced at locations uniformly distributed across the bed with each point located about 5–10 inches from the adjacent air inlet locations. At least a substantial portion of the bed must be located below the air inlet points. This permits the temperature to substantially level out across the bed below the air inlet points provided the prescribed spacing of the inlets is utilized.

The object of this invention is to provide an improved method and apparatus for the regeneration of contaminated contact material which provides uniform reconditioning of the spent material.

A further object of this invention involves the elimination of hot spots and over-heated catalyst in a bed of said catalyst undergoing regeneration in a kiln while maintaining the regeneration capacity at a maximum value.

Another object of this invention is to make provision for the modification of existing kilns in moving bed conversion processes so as to increase the burning capacity thereof.

Another object of this invention is to obtain maximum efficiency of burning of carbon from a contaminated contact catalyst in a regeneration zone in which the combustion air is introduced into a gravitating compact bed of the spent catalyst under the surface of the bed and there is a burning zone below the level of air introduction.

The invention may be understood more clearly by reference to the attached drawings which are highly diagrammatic, and the following detailed description of the invention.

Figures 1, 2:
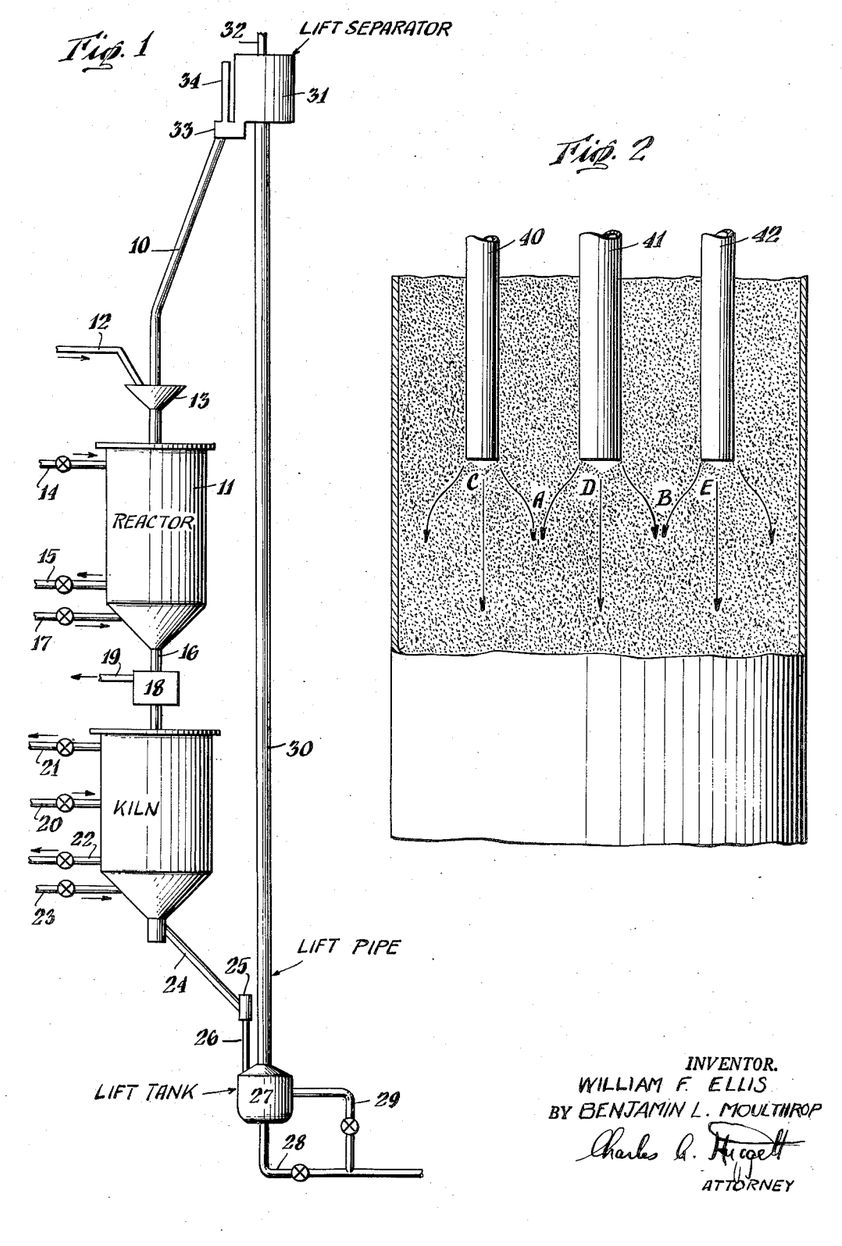
Figure 1 shows an elevation of a complete hydrocarbon conversion system.
Figure 2 shows a vertical elevation partially in section of part of a moving bed kiln.

Referring now to Figure 1, granular contact catalyst is gravitated as a substantially compact mass downwardly through the gravity feed leg 10 into the reactor 11. The reactor is usually maintained under an advanced pressure of about 10–15 pounds per square inch, and the gravity feed leg 10 is used to permit the catalyst to enter the reactor against the advanced pressure therein. An inert seal gas, such as steam or flue gas, is introduced through the pipe 12 into the seal pot 13 at the lower end of the feed leg 10, in sufficient amount to provide a seal for the feed leg 10, and thereby prevent reactants from escaping up the seal leg. The contact material forms a gravitating mass in the reactor and hydrocarbons in suitably prepared state are introduced into the top of the gravitating mass through the pipe 14. The hydrocarbons pass downwardly through the void spaces in the bed and are removed as converted product from the bottom of the reactor through the pipe 15, and transferred to further processing apparatus not shown. The temperature of the mass of catalyst in the reactor may be at about 800 to 1000 degrees for a cracking reaction and will be maintained at other temperature levels for other conversion reactions. As the reaction proceeds, a carbonaceous material is generally deposited upon the catalyst and the catalyst bearing the deposit is removed from the bottom of the reactor through the conduit 16. An inert gas may be introduced into the bottom of the reactor below the draw-off system through the pipe 17, at a suitably elevated pressure to prevent the reactants from travelling downwardly with the catalyst. The gas introduced into the conduit 17, may also serve as a stripping gas to withdraw additional amounts of vaporized hydrocarbons from the catalyst. The pressure on the catalyst may be reduced by passing the catalyst through a depressuring pot 18, the gas being removed through the pipe 19. The catalyst is, therefore, introduced into the pipe 19. The catalyst is, therefore, introduced into the kiln at a pressure approximately atmospheric. The catalyst forms a gravitating mass in the kiln and air is introduced into this mass at an intermediate level through the pipe 20. In the kiln shown on Figure 1, this gas splits into two streams, some of it rising upwardly through the gravitating mass to burn a portion of the contaminant from the catalyst, and some of it travelling downwardly with the gravitating mass to burn an additional amount of carbonaceous material. The upper stream of flue gas formed by the combustion is withdrawn through the conduit 21, at the top of the kiln, and the lower stream of flue gas is withdrawn from the bottom of the kiln through the conduit 22. In some instances, it may be desirable to introduce a seal gas into the bottom of the kiln through the conduit 23. The regenerated contact material is withdrawn from the bottom of the kiln and gravitated as a compact mass through the conduit 24, to a vent pot 25, and is then gravitated as a compact mass through the conduit 26 into the top of the lift tank 27. A lift gas is introduced through either pipes 28 or 29, or preferably through both. The particles are suspended in the stream of lift gas and transferred upwardly through the lift pipe 30 to a lift separator 31. The gas is withdrawn from the separator through the pipe 32 and the separated contact material is withdrawn downwardly through vent pot 33 into the upper end of the feed leg 10. The vent pipe 34 permits seal gas escaping upwardly through feed leg 10 to by-pass the lift separator.

Turning now to Figure 2, there is shown a detail of a portion of a kiln in which gas introduction pipes 40, 41 and 42 are buried in a gravitating mass of catalyst and terminated at a common level at points uniformly distributed across the vessel. The catalyst passing directly beneath the gas introduction pipes 40, 41 and 42 is cooled rapidly by the gas, particularly if the gas temperature is substantially below the catalyst temperature which is the usual situation. A portion of this gas after being discharged from the pipes into the catalyst bed, travels laterally to enter that portion of the catalyst bed between the gas introduction pipes. This gas is heated first by the catalyst directly underneath the gas introduction pipes and, therefore, reaches the intermediate points, such as A and B, at a temperature substantially higher than the temperature of the gas just below the gas introduction pipes at points C, D and E. The catalyst directly beneath the gas introduction pipes is, therefore, cooled substantially below the catalyst intermediate the gas introduction pipes. It was thought that if the spacing of the gas introduction points was reasonably close, such as 15–20 inches, that the catalyst temperature would soon level out across the bed. This has been found not to occur, however, unless the spacing of the air inlet points is less than a critical maximum spacing of about 10 inches.

In present day large commercial TCC systems of about 15,000 barrels per day cracking capacity, split-flow single zone kilns are used of about 7500–8000 lbs./hr. carbon burning rate. The circulation rate of the catalyst is generally about 300–400 tons/hr. A silica-alumina bead is used as the cracking catalyst having a heat damaging limit of about 1400–1450° F., and this limit determines the carbon burning capacity of the kiln. The amount of carbon formed on the catalyst during conversion is generally an indicator of the amount of cracking effected. Therefore, the burning rate in the kiln is one of the limiting factors of the amount of cracking that can be effected by any given TCC unit. The limit of capacity of the split-flow kiln was the heat damaging level of the catalyst. With the gas distributor pipes spaced apart 15.5 inches, this temperature limit was reached in some locations below the air distributors when other portions of the bed were still substantially below the heat damaging level. This difference in temperature was found to be as much as 200° F., or more. When the spacing of the distributors was reduced to about 7 inches, however, this temperature differential was largely eliminated. No improvement is found in spacing the air distribution pipes closer than about 5 inches and the preferred spacing is about 7 inches. At a spacing greater than about 10 inches, however, the temperature differences across the bed at the bottom of the kiln increase rapidly.

EXAMPLE I

A 15,000 bbl./day TCC unit was selected for test which had a split-flow single zone kiln and air lift for catalyst transfer. Silica-alumina beads of about 4–10 mesh Tyler were used, having a heat damaging temperature limit of about 1400° F. The kiln originally had 360 air distributor pipes with frustoconical members at the bottom thereof, similar to those on Figure 3. The pipes were spaced apart about 15.5 inches and the maximum carbon burning rate of the kiln, without exceeding the catalyst heat damaging level, was about 8000 pounds per hour and this permitted about 15,000 bbl./day to be processed in the reactor. The frusto-conical members at the bottom of the air-distributor pipes were modified to a design similar to that shown on Figure 8, reducing the spacing of the air inlet points to 9 inches and increasing the number of air inlet points to 1800. For the same peak temperature, a maximum of about 10,000 pounds per hour of carbon was burned and this permitted an increase in cracking severity to give 5 percent more conversion to hydrocarbons boiling in the gasoline range.

Figure 3:
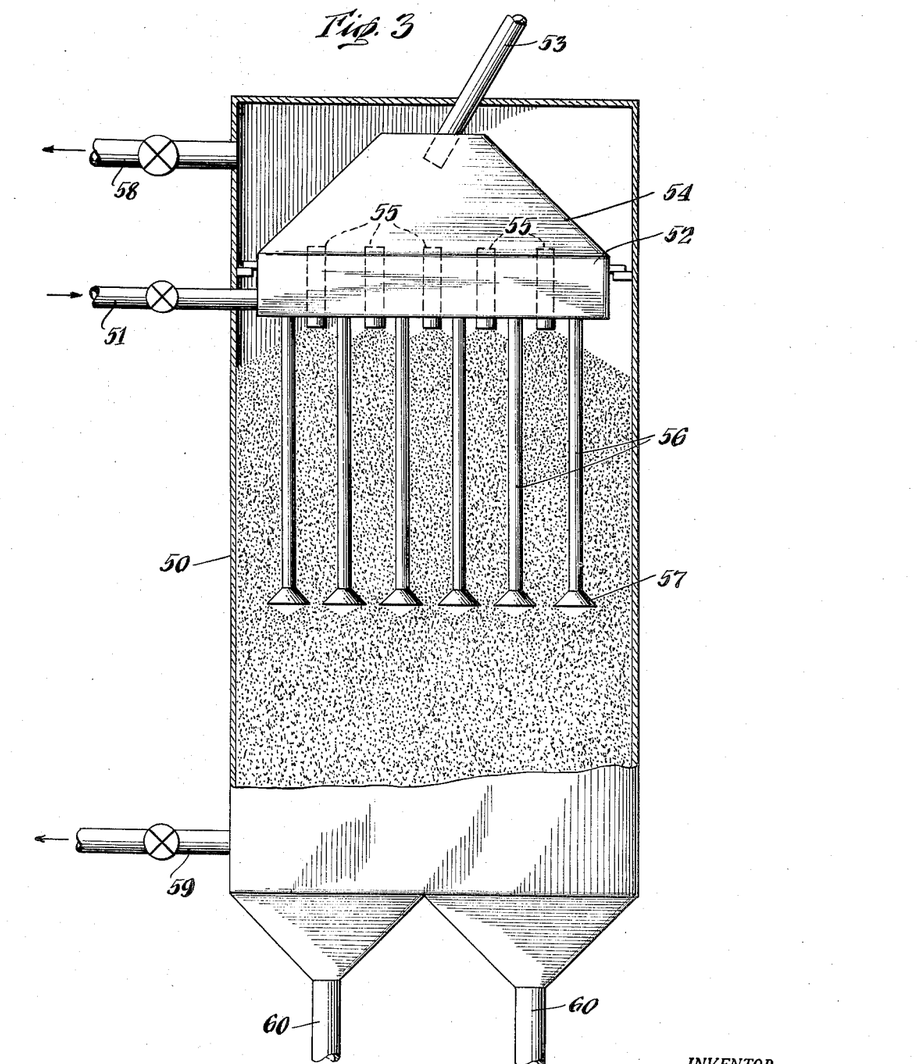
Figure 3 shows a vertical elevation partially in section of a split-flow kiln similar to that used in commercial moving bed processes.

Referring to Figure 3, a vertical section of a split-flow kiln similar to that used commercially in a moving bed cracking process, there is shown in cross-section the gas introduction scheme for the kiln. The air is introduced into the kiln 50 through the pipe 51. Pipe 51 communicates with a header box 52 in the upper portion of the kiln. This header box 52 covers substantially the entire cross-section of the kiln. The spent catalyst is introduced into the kiln through the pipe 53 to form a pile of catalyst on top of the header box beneath a confining cone 54. The catalyst is transferred through the header box through a multiplicity of pipes 55, which project downwardly a short distance below the header box to form the top of a gravitating bed of catalyst in the vessel. A plurality of depending gas introduction pipes 56, are located across the bottom of the header box and project downwardly to a uniform level intermediate the top and bottom of the bed of catalyst in the vessel. These gas introduction pipes are uniformly distributed across the vessel providing means for introducing all the gas into the kiln. They have at their lower ends conical baffles 57 designed to aid the engagement of gas with the catalyst bed. These conical baffles have a gradually increasing cross-section from top to bottom which provides an enlarged bed surface beneath each gas introduction pipe. A portion of the gas travels around the periphery of the conical baffles to travel upwardly to the surface of the bed. The flue gas formed by the combustion of the carbonaceous material on the surface of the catalyst in the upper portion of the bed is withdrawn upwardly about the header box 52 and from the vessel 50 through the pipe 58. The remainder of the air introduced at the lower end of the gas introduction pipe travels downwardly through the bed concurrently with the gravitating column of catalyst.

Flue gas formed by the combustion of this second stream of air is removed from the lower portion of the vessel 50 through a disengaging system, not shown, and pipe 59. Usually a series of cooling coils is located just above the bottom of the bed to extract a certain amount of heat from the hot catalyst. The re-generated catalyst is withdrawn from the bottom of the kiln through the pipes 60 and transferred to the reactor for re-use in the conversion process. The above described gas introduction scheme was used in these commercial kilns to provide maximum free cross-section of the vessel for downward gravitation of the catalyst in that the header box is located above the top of the bed of catalyst and only the gas introduction pipes project downwardly into the bed. Using a scheme such as that described in Figure 3, in which the maximum spacing in inches laterally between gas introduction pipes was 15.5 inches, it was found that in the lower section of the kiln the temperatures across the kiln varied widely. This is shown in case 1, 2 and 3 of Table I, reproduced hereinbelow. It is shown also, that with this spacing there is a large disparity in the carbon content of the regenerated catalyst as it leaves the bottom of the kiln. This, of course, is undesirable in these systems. It was found that for the same kiln and same conditions with a spacing of 9 inches, that the temperature pattern across the bottom of the kiln was substantially improved and that the disparity in carbon content on the catalyst withdrawn from the kiln was largely eliminated. It is seen that more carbon was burned in the lower section of the kiln at a lower peak temperature with the same amount of air. The combustion was more efficient. This is illustrated in case 4, 5 and 6 of Table I.

Table I.—Summary of temperature patterns and carbon distribution in type 75 TCC kiln with the present design and modified design of air-inlet distributors

[Operating conditions for all cases: 400 tons/Hr. catalyst circulation, 40,000 S. C. F. M. Combustion air at 400° F., 875° F. catalyst inlet temperature.]

| Case | I | II | III | IV | V | VI |
|---|---|---|---|---|---|---|
| No. of Air Distributors | 360 | 360 | 360 | 1,800 | 1,800 | 1,800 |
| Maximum Spacing, Inches | 15.5 | 15.5 | 15.5 | 9.0 | 9.0 | 9.0 |
| Carbon on Catalyst, Percent Wt.: | | | | | | |
| Catalyst to Kiln | 0.855 | 1.055 | 1.255 | 0.855 | 1.055 | 1.225 |
| Catalyst Above Air Inlets | 0.000 | 0.200 | 0.400 | 0.000 | 0.200 | 0.400 |
| Calc. Carbon Burning Cap., Lb./Hr.: | | | | | | |
| Top | 6,850 | 6,850 | 6,850 | 6,850 | 6,850 | 6,850 |
| Bottom | | 1,500 | 2,870 | | 1,560 | 2,990 |
| Total | 6,850 | 8,350 | 9,720 | 6,850 | 8,410 | 9,840 |
| Catalyst Temp., °F.: | | | | | | |
| Above Air Inlets | 1,350 | 1,350 | 1,350 | 1,350 | 1,350 | 1,350 |
| Below Air Inlets— | | | | | | |
| Max | 1,350 | 1,350 | 1,350 | 1,350 | 1,350 | 1,350 |
| Min | 650 | 650 | 650 | 650 | 650 | 650 |
| 20-Inches Below Inlets— | | | | | | |
| Max | 1,330 | ¹1,375 | 1,424 | 1,290 | ¹1,340 | ¹1,381 |
| Min | 735 | 735 | 735 | 800 | 802 | 803 |
| 7-Feet Below Inlets— | | | | | | |
| Max | 1,275 | 1,356 | ¹1,464 | 1,200 | 1,292 | 1,367 |
| Min | 845 | 855 | 865 | 970 | 1,030 | 1,066 |
| Above Cooling Coils— | | | | | | |
| Max | 1,235 | 1,325 | 1,435 | 1,150 | 1,259 | 1,329 |
| Min | 930 | 975 | 1,005 | 1,085 | 1,197 | 1,295 |
| Reg. Catalyst Above Coils, Percent Wt. Carbon: | | | | | | |
| Max | -------- | 0.144 | 0.320 | -------- | 0.035 | 0.102 |
| Min | -------- | 0.003 | 0.016 | -------- | 0.003 | 0.017 |
| Avg | -------- | 0.012 | 0.041 | -------- | 0.006 | 0.027 |

¹ Peak temperature.

Note.—The cooling coils are located in the lowermost portion of the burning zone and very little burning occurs in that portion of the zone.

Figure 4:
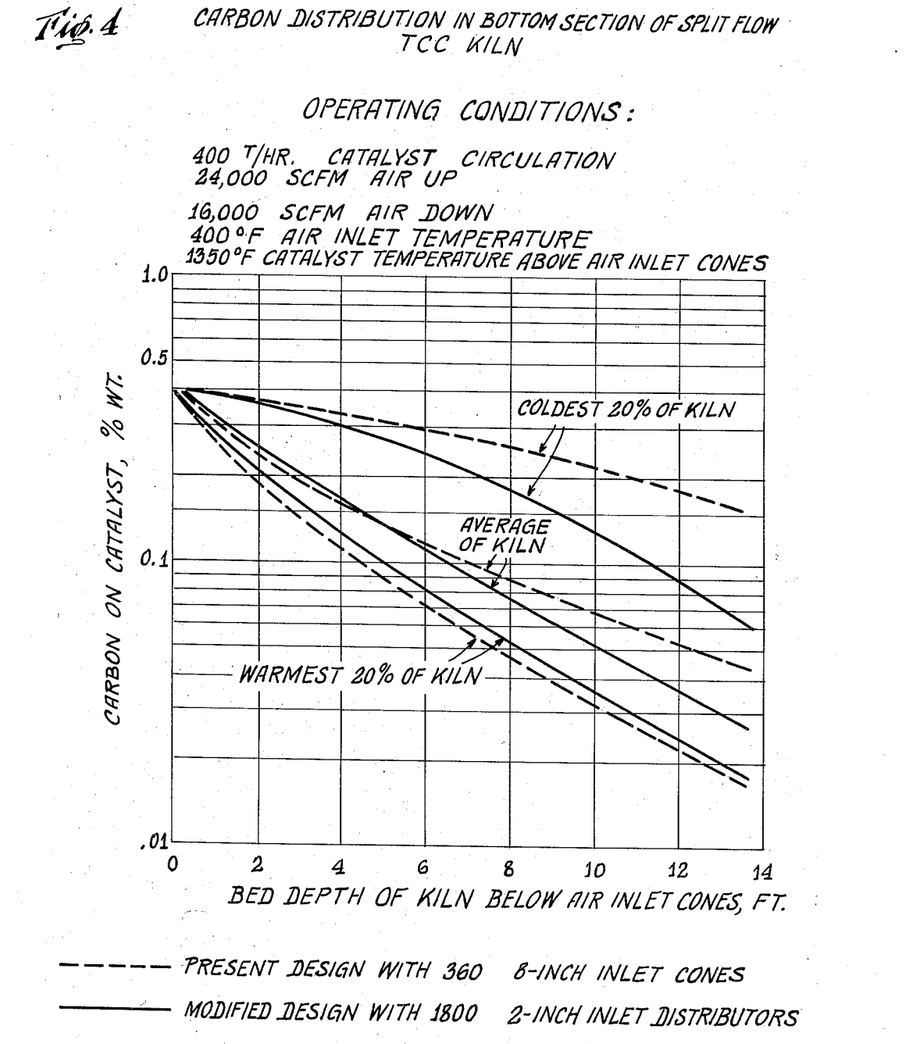
Figure 4 shows a plot of the carbon distribution in the bottom section of a split-flow TCC kiln.
Figure 5:
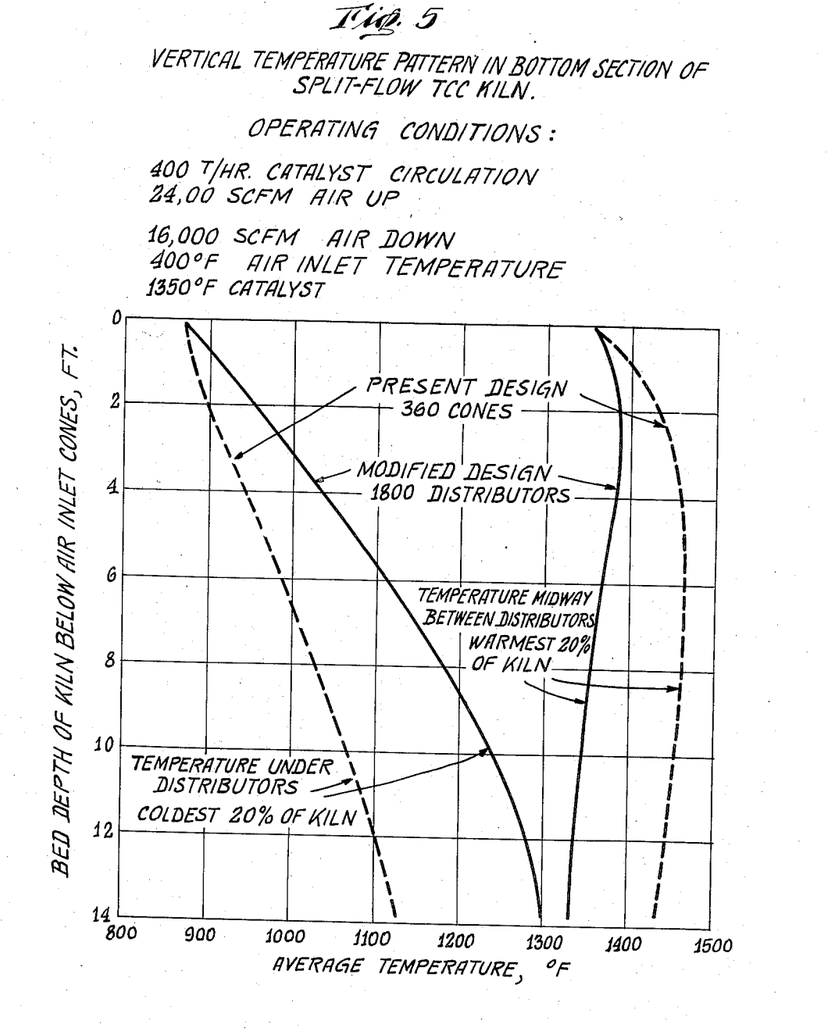
Figure 5 shows a plot of vertical temperature patterns in the bottom section of a split-flow TCC kiln.

Referring to Figure 4, there is shown a plot of carbon distribution in the bottom section of a split-flow kiln operating under conditions described above for Table I. This figure shows the carbon content on the catalyst at varying levels below the air inlet down to the bottom of the kiln. It is seen that with the use of the closer spacing of air inlet pipes as shown by the solid lines, that the carbon content of the coldest portion of the kiln bends substantially closer to the carbon content of the warmest portion of the kiln, than when the larger spacing is used. Similarly, Figure 5 illustrates that the temperature pattern is more uniform with the closer spacing. This is a plot of vertical temperature pattern in the bottom section of the split-flow kiln under similar operating conditions to those used for Table I. The temperature differences at the lower end of the distributor pipes is the same in both cases. When using the closed spacing of inlet pipes, however, it is seen that the temperature difference across the kiln is largely ironed out by the time the catalyst reaches the bottom of the kiln, which is not true for the case in which the larger spacing of air inlet pipes is used. With the spacing used previously, it is important to note that the temperature pattern across the bed will never be ironed out regardless of whatever practical bed depth is used.

Figure 6:
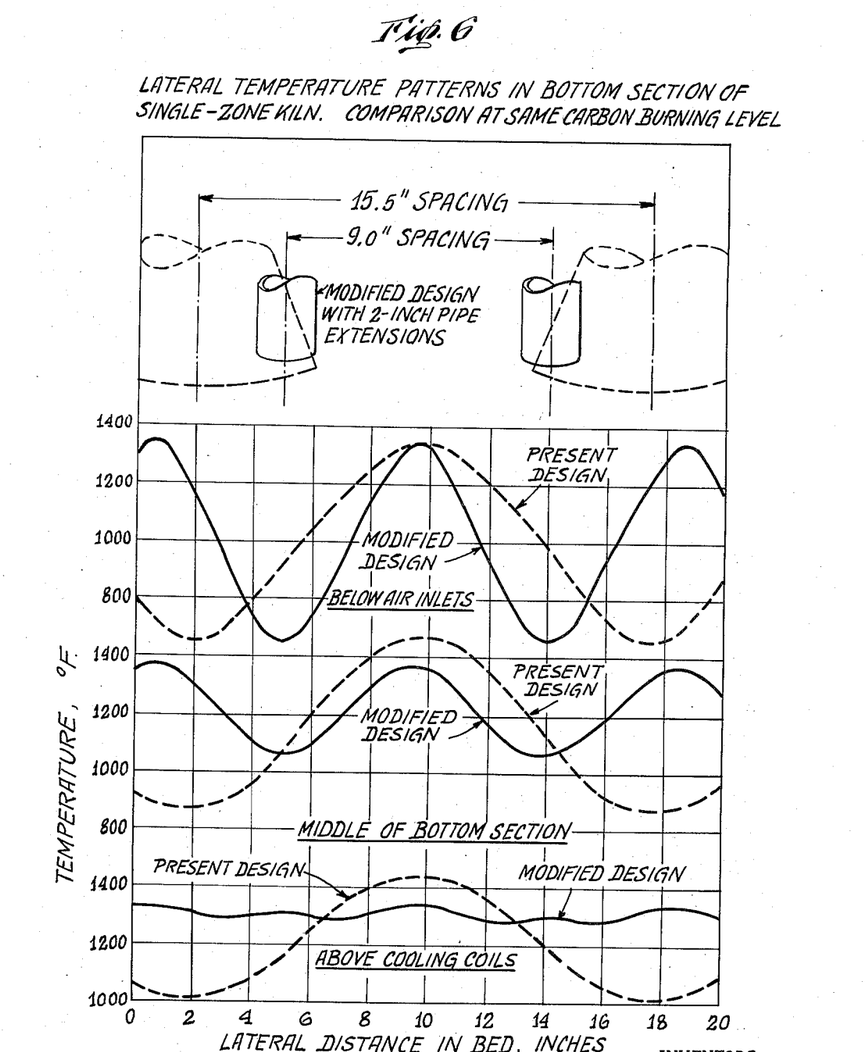
Figure 6 shows a plot of lateral temperature patterns in the bottom section of a split-flow TCC kiln, comparisons being made at constant carbon burning rate.

Figure 6 also shows a comparison of lateral temperature patterns in the bottom section of a split-flow kiln for conditions similar to those described hereinabove. There is seen again that just below the air inlet pipes even with the smaller spacing taught by this invention, the disparity in temperature between the hottest and coldest portion of the bed is just as great as that taught by the prior art, but that the temperature begins to line out rapidly at a short distance below the air inlet pipes. At the bottom of the kiln the temperature across the vessel for the closer spacing is seen to be largely uniform, whereas that using the spacing of the prior art shows that there is a considerable disparity in temperature across the kiln remaining. Figure 6 was plotted on the basis of the same carbon burning level for each lateral spacing of the air inlet pipe.

Figure 7:
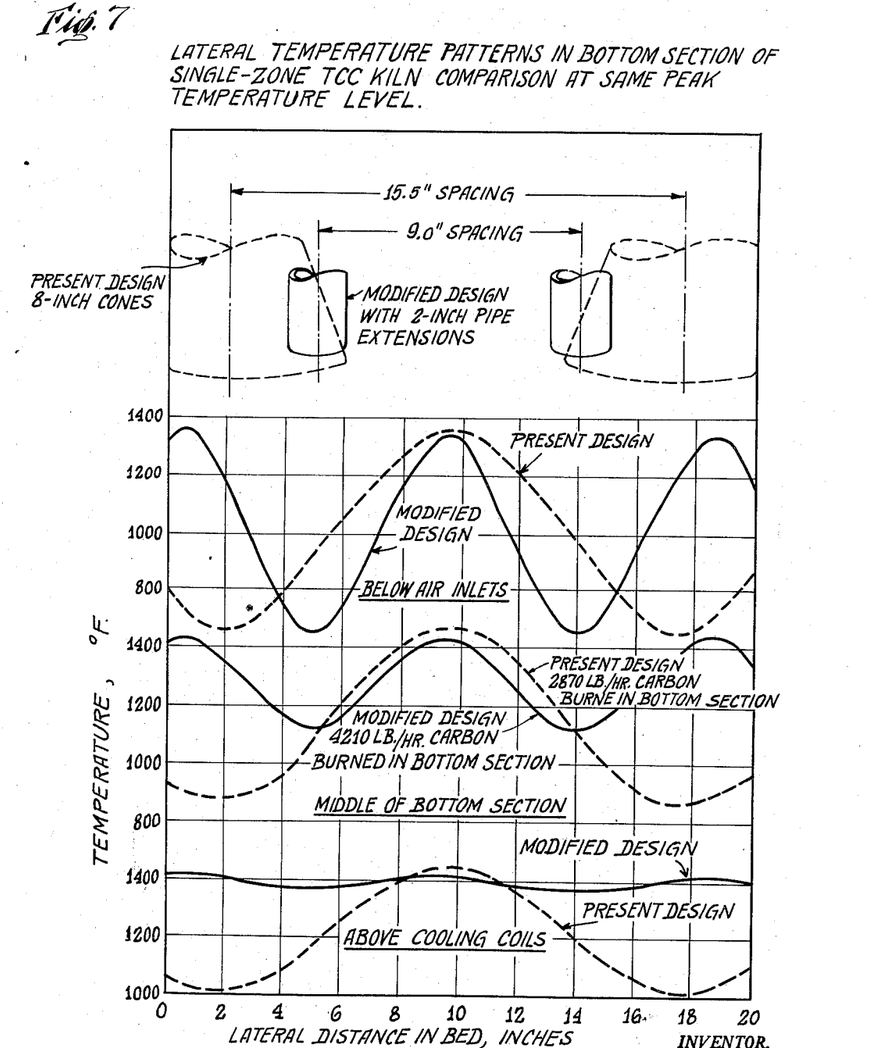
Figure 7 shows a plot of lateral temperature patterns in the bottom section of a split-flow TCC kiln, comparisons being made at constant peak temperature.

Figure 7 is a plot similar to Figure 6, but the kiln is operated at the same peak temperature level when using the new spacing as compared to the prior art spacing. Figure 7 also shows that under the operating conditions of Figure 7, the temperature pattern in the lower section of the kiln is largely ironed out with the new spacing, whereas it is not for the prior art spacing. This invention teaches the criticality of spacing of the air inlet pipes in the kiln of a moving bed process in which at least a portion of the gas and catalyst flow is concurrent, and the air is introduced below the surface of the catalyst bed.

Figures 8, 9, 10, 11, 12, 13, 14, 15:
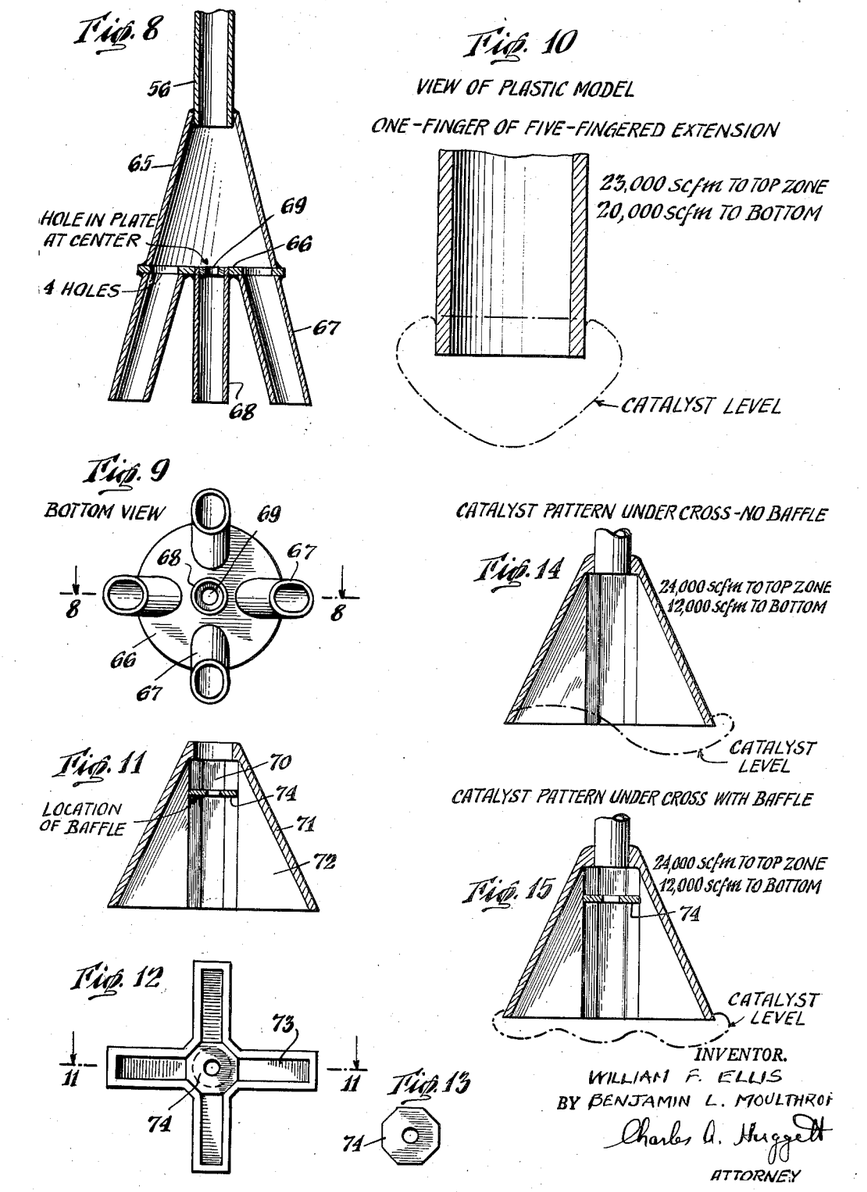
Figure 8 shows in vertical section an air distributor for a split-flow TCC kiln.
Figure 9 shows a plan view of the distributor of Figure 8.
Figure 10 shows the vertical sectional view of an air inlet pipe showing the catalyst pattern below the pipe.
Figure 11 shows in vertical section an alternate air distributor for a split-flow TCC kiln.
Figure 12 shows a plan view of the distributor of Figure 11.
Figure 13 shows a plan view of the baffle used in the distributor of Figure 11.
Figure 14 shows the catalyst pattern under the distributor of Figure 11, without the baffle shown on Figure 13.
Figure 15 shows the effect of the baffle 13 on the catalyst pattern beneath the distributor.

Figure 8 shows a gas distributor for use at the bottom of the air introduction pipe which introduces gas into the bed at points uniformly distributed across the area beneath the gas distributor which are less than the critical maximum spacing. These distributors are designed to effect uniform distribution of the gas at all of the points of entrance of the gas from the distributor into the catalyst bed. The distributor has a frusto-conical section 65 attached to the lower end of the gas introduction pipe 56. The frusto-conical section of the distributor has a substantially horizontal plate 66 located across its lower end. Attached to the plate about the periphery thereof is a series of downwardly extending pipes 67 disposed at about the same angle with the horizontal as the side wall of the conical section. These pipes 67 are short and extend outwardly like fingers in a ring. The pipes communicate freely with the interior of the distributor, allowing the gas to be distributed in a generally uniform manner therethrough. At the center of the plate 66, there is located another short pipe 68 disposed substantially vertical. This pipe communicates with the interior of the distributor 65, through an aperture in the plate 66. It has been found that for best gas distribution through all the short pipes 67 and 68, that the cross-section of the upper end of the substantially vertical pipe 68 must be restricted to some extent. This is done by locating an orifice plate 69 in the upper end of the central short pipe 68. This orifice is appropriately sized to provide uniform distribution to all the pipes. This may be a separate orifice plate inserted in the pipe, or it may be an aperture in the plate 66 of smaller cross-section than the cross-sectional interior of pipe 68. The term "orifice plate" is intended to define both types of construction.

Figure 9 shows a view of the above described distributor from a location directly beneath the distributor.

Figure 10 shows a cross-section of one of the fingers of one of the above described distributors which was prepared in the form of a plastic model and tested in a catalyst bed at a gas flow substantially that which must flow through one of these fingers when this type of distributor is used in a commercial moving bed kiln. The catalyst level about this gas introduction pipe is shown on Figure 10.

Figure 11 shows in vertical section an alternate type of distributor proposed for similar use in a moving bed kiln. In this design, a central vertical pipe 70 is attached to the lower end of the gas introduction pipe. This central pipe has vertical slots cut in its side wall at uniform intervals around the pipe. These slots communicate the interior of pipe 70 with a plurality of ears 71 located uniformly about the central pipe 70. These ears are formed of triangular side wall 72, located at each side of one of the vertical slots in the pipe 70 and a sloping top wall 73 attached to each side of the triangular sections. This arrangement provides a gas introduction finger on the distributor of gradually increasing cross-section from the top of the slot to the bottom thereof. In order to provide uniform distribution through the ears and also through the central pipe, an orifice plate 74 is located in the central pipe 70 intermediate the top and bottom thereof.

Figure 12 shows a view of the distributor of Figure 11 from a position directly beneath the distributor.

Figure 13 shows a detail of the baffle or orifice plate 74 used to effect uniform distribution of gas through the distributor.

Figure 14 shows a vertical sectional view of the distributor with a showing of the catalyst level underneath the distributor for a gas flow required for commercial utilization of this distributor without the use of a central orifice plate 74 or baffle. Without the baffle or orifice plate, the catalyst is seen to build up under the discharge end of one of the ears and to be depressed underneath an ear on the opposite side of the distributor.

Figure 15 shows a vertical sectional view of the distributor with the baffle 74 installed, and shows that the catalyst level beneath the distributor has been made uniform by the installation of the baffle, indicating that the air introduction from all points at the lower end of the distributor is uniform. The baffle or plate 74, therefore, provides uniform distribution of gas to the bed from all points of the distributor despite slight misalignment of the distributor. This is highly important in moving bed kilns in order to provide uniform temperatures across the catalyst bed.

The peak temperature of about 1400–1450° F., found for silica-alumina bead catalyst, may be different for other types of catalyst. However, the spacing of the distributors is not affected by the peak temperature and hence, the spacing of 5–10 inches is correct for other types of catalyst. The metal in the kiln is designed to withstand the peak temperature of the catalyst. Therefore, temperatures in excess of the peak temperature of the catalyst will also damage the kiln internals.

The kiln used commercially in the TCC process is an upright vessel about 46 feet tall and 27½ feet in cross-sectional diameter. The vessel has an annular cross-sectional shape providing an annular gravitating bed about 8 feet in radial thickness. The inner circular wall of the kiln has cross-sectional diameter of about 10 feet. The air is introduced at an intermediate level to travel upwardly and downwardly through the bed. The upper portion of the bed above the air inlets is about 7 feet deep and the lower portion of the bed below the air inlets is about 16 feet deep. This kiln was capable of burning about 9000 lbs./hr. of coke from the catalyst at a circulation rate of about 400 tons/hr., air flow rate of 36,000 S. C. F. M., and a maximum limiting temperature of about 1450° F., using 360 conical type air inlet, previously described. By modifying this kiln in the manner taught by this invention, the burning rate of the same kiln was increased about 10–20 percent at the same or lower peak temperature.

The air distributor spacing is affected to some extent by the ratio of the heat capacity of the catalyst to that of the air. Preferably, the catalyst to air heat capacity range is about 4½ to 1 although it may vary from about 3 to 1 up to about 10 to 1 without affecting the spacing of the air distributors. A preferred range of catalyst to total air heat capacities is about 4.0–6.0 to 1. This is substantially equal to the ratio of catalyst flow to total air flow on a lb./lb. basis since the specific heat of both air and catalyst is about 0.25

$$\frac{B. t. u.}{lb.}$$

The range of variables within which this invention has particular application are shown in Table II.

*Table II*

| Variable | Preferred Range | Broad Range |
|---|---|---|
| Air Inlet Spacing Center to Center, in | 5.0–7.0 | 5.0–10.0 |
| Ratio of Catalyst to Total Air, lb./lb. | 4.0–6.0 | 3.0–10.0 |
| Residence Time Below Air Inlets, Min. | 15–30 | 10–60 |
| Catalyst to Air ΔT at Air Inlets, ° F. | | 400–1,000 |
| Catalyst Inlet Temperature, ° F. | 850–950 | 850–1,000 |
| Peak Temperature, ° F. | 1,350–1,450 | 1,200–1,475 |
| Air Inlet Temperature, ° F. | 450–950 | 200–1,075 |
| Fresh Carbon on Catalyst at Air Inlets, Percent Wt. Above Residual Carbon | 0.3–0.5 | 0.2–0.6 |
| Residual Carbon from Kiln, Percent Wt. | 0.1–0.3 | 0.1–1.0 |

Figure 16:
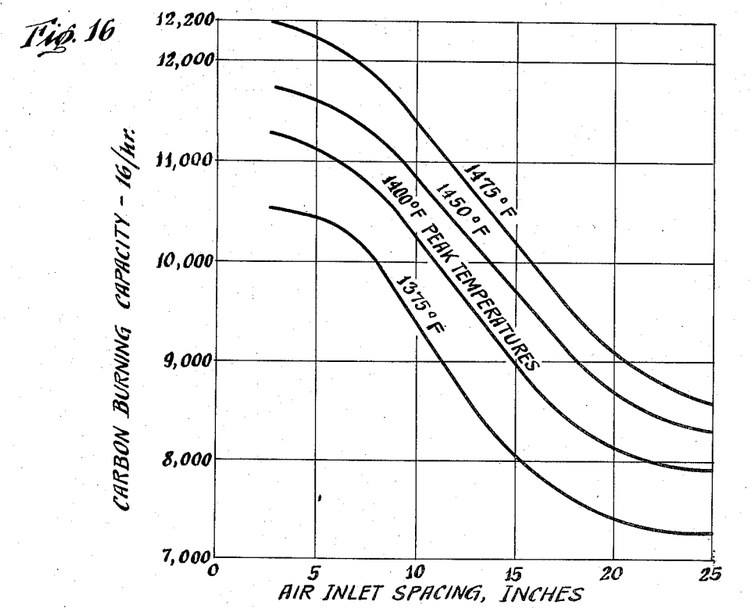
Figure 16 shows curves illustrating the effect of air-inlet spacing on carbon load and peak temperatures.

Figure 16 shows a plot of carbon burning capacity in pounds per hour against air inlet spacing in inches for various limiting peak temperatures. These curves are given for a kiln used commercially in the TCC process. It comprises an upright vessel about 46 feet high and 27½ feet in cross-sectional diameter. The vessel has an annular cross-sectional shape providing an annular gravitating bed about 8 feet in radial or lateral thickness. The inner circular wall of the kiln has a cross-sectional diameter of about 10 feet. The air is introduced at an intermediate level to travel upwardly and downwardly through the bed. The upper portion of the bed above the air inlets is about 7 feet deep and the lower portion of the bed below the air inlets is about 16 feet deep. These curves were plotted for a catalyst circulation rate of about 400 tons/hr. and a total combustion air flow rate of about 40,000 S. C. F. M. It is seen that the curves all break at an air inlet spacing of about 10 inches and a spacing less than about 10 inches is, therefore required for maximum efficiency of burning. No substantial improvement in burning efficiency is evidenced at a spacing less than about 7 inches, and this spacing is, therefore preferred. At a spacing less than 5 inches an excessive amount of the free cross-section of the kiln is occupied by the inlet pipes, impeding the downward flow of catalyst to an undesirable degree and spacing less than 5 inches is undesirable for that reason. While these curves are plotted for a particular kiln at a circulation rate of 400 tons/hr. of catalyst and 40,000 S. C. F. M. combustion air flow, they can be applied to other split-flow kiln operation by ratioing the carbon burned and air rate of catalyst circulation. For example:

| Catalyst Circulation, T/Hr | 300 | 400 | 1,000 |
|---|---|---|---|
| Spacing, inches | 6 | 6 | 6 |
| Peak Temperature, ° F | 1,450 | 1,450 | 1,450 |
| Air Rate, S. C. F. M | 30,000 | 40,000 | 100,000 |
| Carbon Burned, lb./hr | 8,640 | 11,500 | 28,700 |

Figure 17:
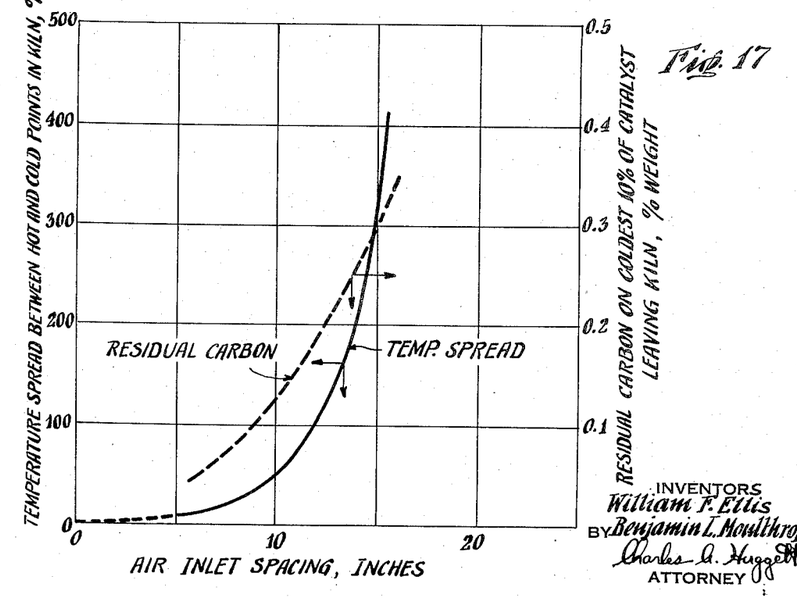
Figure 17 shows curves illustrating the effect of air-inlet spacing on temperature spread and residual carbon at the bottom of the kiln burning zone.

Figure 17 shows, for a kiln such as described with reference to Figure 16 and at the same operating conditions, a plot of maximum ΔT in the bottom of the kiln vs. air inlet spacing and residual carbon content on the coldest portion of the catalyst leaving the kiln vs. air inlet spacing. The curves show the decided improvement in combustion efficiency to be obtained by maintaining the spacing below about 10 inches and they also show that little improvement is obtained in reducing the air inlet spacing below about 5 inches.

The examples given hereinabove are given to illustrate the invention and not to limit the scope of the invention to any specific example. The only limitations on the scope of the invention are contained in the attached claims.

We claim:

1. The method of regenerating a spent contact catalyst by contacting the material at elevated temperature with air at a substantially lower temperature which comprises: gravitating the contact material downwardly through a regeneration zone as a compact mass, introducing air into the mass at a plurality of points uniformly distributed across the bed at a level intermediate the top and bottom of the bed, the spacing between adjacent points of air introduction being limited at less than ten inches, flowing at least a portion of the air downwardly from the air inlet points to burn at least a portion of the carbon from the catalyst, and removing flue gas from the lower portion of the bed, whereby the burning is effected at maximum efficiency.

2. The method of regenerating a spent contact catalyst by contacting the material at elevated temperature with air at a substantially lower temperature which comprises: gravitating the contact material downwardly through a regeneration zone as a compact mass, introducing air into the mass at a plurality of points uniformly distributed across the bed at a level intermediate the top and bottom of the bed, the spacing between adjacent points of air introduction being limited at less than 10 inches, flowing a portion of the air upwardly from the air inlet points to burn a portion of the carbon from the catalyst, and removing flue gas from the top of the bed, flowing the remainder of the air downward from the air inlet points to burn the remainder of the carbon from the catalyst and removing flue gas from the bottom of the bed.

3. The method of regenerating a spent contact catalyst by contacting the material at elevated temperature with air at a substantially lower temperature which comprises: gravitating the contact material downwardly through a regeneration zone as a compact mass, introducing air into the mass at a plurality of points uniformly distributed across the bed at a level intermediate the top and bottom of the bed, the spacing between adjacent points of air introduction being limited between about 5–10 inches, flowing a portion of the air upwardly from the air inlet points to burn a portion of the carbon from the catalyst and removing flue gas from the top of the bed, flowing the remainder of the air downward from the air inlet points to burn the remainder of the carbon from the catalyst and removing flue gas from the bottom of the bed.

4. An improved kiln comprising in combination: an upright shell, inlet means in the top and outlet means in the bottom of said shell, gas introduction means adapted for the introduction of gas uniformly across substantially the entire cross-section of said shell comprising at least one gas introduction pipe projected downwardly within the shell and terminated at its lower end intermediate the top and bottom of the vessel, means attached to the upper end of said gas introduction pipe and communicated with the exterior of the shell, for introducing gas into said gas introduction pipe, a gas distributor at the lower end of the gas introduction pipe, adapted to split the gas stream issuing from said gas introduction pipe into several substantially separate streams and direct them to laterally separated discharge points, each discharge point being separated laterally from an adjacent discharge point by not more than 10 inches, and means for withdrawing gas from said shell at a spaced level below the gas introduction means.

5. An improved kiln comprising in combination: an upright shell, inlet means in the top and outlet means in the bottom, gas introduction means adapted for the introductions of gas uniformly across substantially the entire cross-section of said shell comprising at least one gas introduction pipe projected downwardly within the shell and terminated at its lower end intermediate the top and bottom of the vessel, means attached to the upper end of said gas introduction pipe and communicated with the exterior of the shell, for introducing gas into said gas introduction pipe, a gas distributor at the lower end of the gas introduction pipe, comprising a frusto-conical member depending from said pipe, a plate horizontally disposed across the bottom of said member, a plurality of short pipes attached to said plate uniformly about the periphery thereof, disposed at an angle with the horizontal substantially the same as the side wall of the frusto-conical member, communicating freely with the interior of said frusto-conical member, a central short pipe depending from said plate, in substantial alignment with the gas introduction pipe and an orifice plate in said central pipe, sized to provide substantially uniform gas distribution from all the short pipes attached to said plate and means for withdrawing gas from said shell at a spaced level below the gas introduction means, the lateral distance between the lower end of the short pipes being not more than about 10 inches.

6. An improved kiln comprising in combination: an upright shell inlet means in the top and outlet means in the bottom, gas introduction means adapted for the introduction of gas uniformly across substantially the entire cross-section of said shell comprising at least one gas introduction pipe projected downwardly within the shell and terminated at its lower end intermediate the top and bottom of the vessel, means attached to the upper end of said gas introduction pipe and communicated with the exterior of the shell, for introducing gas into said gas introduction pipe, a gas distributor at the lower end of the gas introduction pipe, comprising a central passageway of uniform cross-section from top to bottom in substantial alignment with the gas introduction pipe, and a plurality of ears attached uniformly about the periphery of said central passageway, said ears comprising substantially vertical triangular side walls and a sloping outer wall attached to said side walls, the interior of the ears being communicated with the interior of the central passageway by means of vertical slotted apertures in the side wall of the central passageway, an orifice plate located horizontally intermediate the top and bottom of said central passageway, sized to provide substantially uniform gas distribution through the ears and central passageway of the gas distributor, and means for withdrawing gas from said shell at a spaced level below the gas introduction means, the lateral distance between the lower end of each ear and the nearest adjacent ear being less than about 10 inches.

References Cited in the file of this patent
UNITED STATES PATENTS

| | | |
|---|---|---|
| 2,492,958 | Bland | Jan. 3, 1950 |
| 2,561,771 | Ardern | July 24, 1951 |
| 2,666,731 | Bergstrom | Jan. 19, 1954 |
| 2,684,927 | Bergstrom | July 27, 1954 |

FOREIGN PATENTS

| | | |
|---|---|---|
| 677,095 | Great Britain | Aug. 6, 1952 |

UNITED STATES PATENT OFFICE
CERTIFICATE OF CORRECTION

Patent No. 2,857,335                        October 21, 1958

Benjamin L. Moulthrop et al.

It is hereby certified that error appears in the printed specification of the above numbered patent requiring correction and that the said Letters Patent should read as corrected below.

Columns 5 and 6, Table 1, seventh column thereof, under the heading "VI", line 3, for "1.225" read -- 1.255 --.

Signed and sealed this 27th day of January 1959.

(SEAL)
Attest:
KARL H. AXLINE
Attesting Officer

ROBERT C. WATSON
Commissioner of Patents